(12) United States Patent
Irie

(10) Patent No.: US 12,344,330 B2
(45) Date of Patent: Jul. 1, 2025

(54) MANAGER, SYSTEM, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventor: Ryo Irie, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/735,705

(22) Filed: May 3, 2022

(65) Prior Publication Data
US 2022/0371653 A1    Nov. 24, 2022

(30) Foreign Application Priority Data
May 21, 2021    (JP) .................... 2021-086281

(51) Int. Cl.
*B62D 5/04*    (2006.01)
*B60W 50/029*    (2012.01)

(52) U.S. Cl.
CPC ......... *B62D 5/0484* (2013.01); *B60W 50/029* (2013.01); *B60W 2050/0292* (2013.01)

(58) Field of Classification Search
CPC ... B60W 2050/022; B60W 2050/0292; B60W 2050/0006; B60W 2050/0295; B60W 50/023; B60W 30/09; B60W 50/029; B60W 50/035; B60W 30/12; B60W 30/165; B62D 5/0484; B62D 15/0285
See application file for complete search history.

(56) References Cited

U.S. PATENT DOCUMENTS

| | | | | |
|---|---|---|---|---|
| 2012/0253608 A1* | 10/2012 | Aoki | ............... | B62D 17/00 701/49 |
| 2012/0283907 A1* | 11/2012 | Lee | ............... | B60T 8/17557 701/32.9 |
| 2018/0134267 A1* | 5/2018 | Mitsumoto | ............... | B60T 8/58 |
| 2019/0361449 A1 | 11/2019 | Ueno et al. | | |
| 2020/0070849 A1* | 3/2020 | Suzuki | ............... | B60W 40/109 |
| 2022/0083068 A1* | 3/2022 | Shirvani | ............... | G06N 3/045 |
| 2022/0144249 A1* | 5/2022 | Do | ............... | B60T 8/17558 |
| 2022/0289199 A1* | 9/2022 | Sun | ............... | B60W 50/10 |

FOREIGN PATENT DOCUMENTS

| | | |
|---|---|---|
| JP | 2002-037112 A | 2/2002 |
| JP | 2018-131042 A | 8/2018 |
| JP | 2020-032894 A | 3/2020 |
| JP | 2021-104702 A | 7/2021 |

* cited by examiner

*Primary Examiner* — Abby Y Lin
*Assistant Examiner* — Dylan M Katz
(74) *Attorney, Agent, or Firm* — Oliff PLC

(57) ABSTRACT

A manager mounted on a vehicle includes one or more processors configured to receive a plurality of kinematic plans from a plurality of advanced driver assistance system applications, arbitrate the kinematic plans, calculate motion request based on an arbitration result of the kinematic plans regardless of presence or absence of failure of a plurality of actuator systems including steering systems, and distribute the motion request to at least one of the actuator systems according to content of the failure of the actuator systems.

8 Claims, 4 Drawing Sheets

MANAGER, SYSTEM, CONTROL METHOD, NON-TRANSITORY STORAGE MEDIUM, AND VEHICLE

CROSS-REFERENCE TO RELATED APPLICATION

This application claims priority to Japanese Patent Application No. 2021-086281 filed on May 21, 2021, incorporated herein by reference in its entirety.

BACKGROUND

1. Technical Field

The present disclosure relates to a manager mounted on a vehicle, a system, a control method, a non-transitory storage medium, and the vehicle.

2. Description of Related Art

In recent years, a plurality of applications that realizes driver assistance functions (autonomous driving, autonomous parking, or the like) has been installed in vehicles. Japanese Unexamined Patent Application Publication No. 2020-032894 discloses a control device (a manager) that receives requests output from each of the plurality of applications, arbitrates the plurality of requests received from the plurality of applications, and outputs a request to drive an actuator system (a steering device, a brake device, or the like) mounted on the vehicle based on an arbitration result.

SUMMARY

Applications installed in a vehicle include a plurality of advanced driver assistance system applications (ADAS applications) that require a kinematic plan to cause a trajectory of the vehicle to follow a target trajectory. In such ADAS applications, in order to achieve optimization by absorbing errors and disturbances caused by differences in vehicle characteristics or actuator systems mounted on the vehicle, it is conceivable to input feedback on a state of the actuator system and reflect it in a kinematic plan.

However, when the ADAS application has a system configuration which requires a kinematic plan while attention is always paid to the state (a failure, or the like) of the actuator system, there is a risk that the design of an electronic control unit (ECU) or an interface (I/F) in which the ADAS application is installed will be complicated.

The present disclosure provides a manager, a system, a control method, a non-transitory storage medium, and a vehicle capable of receiving a kinematic plan requested by an ADAS application and suitably distributing motion requests regardless of a state of an actuator system mounted on the vehicle.

A first aspect of the present disclosure relates to a manager mounted on a vehicle. The manager includes one or more processors configured to receive a plurality of kinematic plans from a plurality of ADAS applications, arbitrate the kinematic plans, calculate a motion request based on an arbitration result of the kinematic plans regardless of presence or absence of failure in a plurality of actuator systems including a steering system including a steering actuator, and distribute the motion request to at least one of the actuator systems according to content of the failure in the actuator systems.

In the first aspect, the one or more processors may receive, as the kinematic plans, curvatures required for the ADAS applications to correct a current vehicle trajectory to a target trajectory.

In the first aspect, the one or more processors may distribute the motion request only to actuator systems that do not fail from among the plurality of actuator systems.

In the first aspect, the steering systems may be redundantly structured in the plurality of actuator systems to which the one or more processors distribute the motion request.

A second aspect of the present disclosure relates to a system mounted on a vehicle. The system includes a plurality of ADAS applications configured to respectively output curvatures to correct a current vehicle trajectory to a target trajectory, a plurality of actuator systems including at least steering systems that are redundantly structured and include steering actuators, respectively, and a manager including one or more processors configured to receive a plurality of the curvatures from the ADAS applications, arbitrate the curvatures, calculate a motion request based on an arbitration result of the curvatures regardless of presence or absence of failure in the actuator systems, and distribute the motion request to at least one of the actuator systems according to content of the failure in the actuator systems.

A third aspect of the present disclosure relates to a control method executed by a computer of a manager that includes one or more processors and a memory and that is mounted on a vehicle. The control method includes receiving a plurality of kinematic plans from a plurality of ADAS applications, arbitrating the kinematic plans, calculating a motion request based on an arbitration result of the kinematic plans regardless of presence or absence of failure in a plurality of actuator systems including a steering systems including a steering actuator, and distributing the motion request to at least one of the actuator systems according to content of the failure in the actuator systems.

A fourth aspect of the present disclosure relates to a non-transitory storage medium storing instructions that can be executed by a computer of a manager, and that cause the computer to perform functions. The manager includes one or more processors and a memory and is mounted on a vehicle The functions include receiving a plurality of kinematic plans from a plurality of ADAS applications, arbitrating the kinematic plans, calculating a motion request based on an arbitration result of the kinematic plans regardless of presence or absence of failure in a plurality of actuator systems including a steering system including a steering actuator, and distributing the motion request to at least one of the actuator systems according to content of the failure in the actuator systems.

A fifth aspect of the present disclosure relates to a vehicle on which the manager is mounted.

With each aspect of the present disclosure, an ADAS application can request a manager to make a usual kinematic plan without paying attention to a state (a failure and the like) of an actuator system mounted on a vehicle, and based on an arbitrated kinematic plan, the manager can execute suitable distribution of motion requests according to the state of the actuator system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A manager of the present disclosure implements, when a malfunction, such as a failure, occurs in an actuator system, a motion request according to a kinematic plan, by distributing motion request parts distributed to failing actuator systems to other actuator systems. Hereinafter, an embodiment of the present disclosure will be described in detail with reference to the drawings.

Embodiment

Configuration

Figure 1:
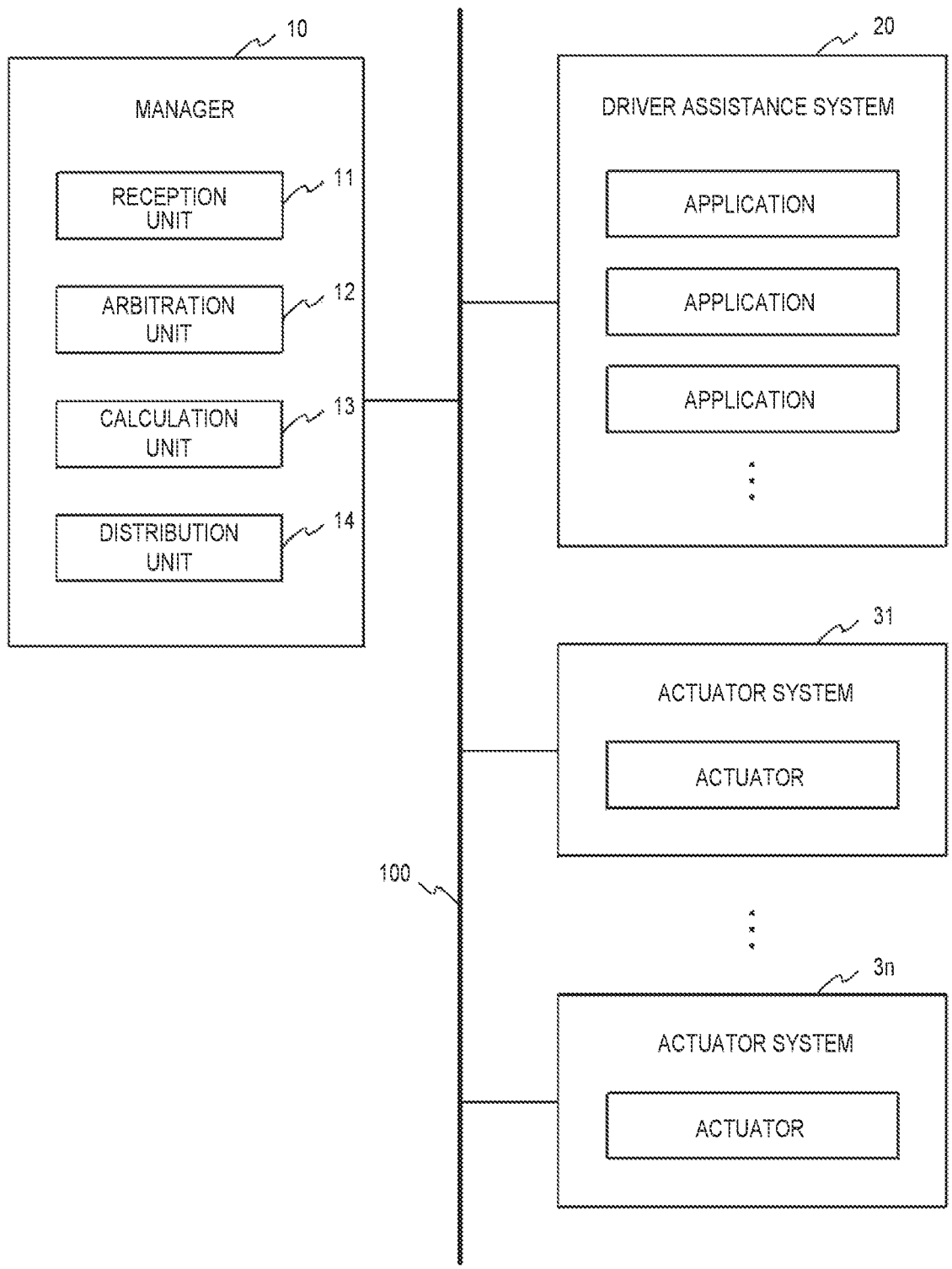
FIG. 1 is a schematic diagram illustrating a configuration example of a system according to an embodiment of the present disclosure.

FIG. 1 is a schematic diagram illustrating a configuration example of a system mounted on a vehicle according to an embodiment of the present disclosure. A vehicle system 1 illustrated in FIG. 1 includes a manager 10, a driver assistance system 20, and a plurality of actuator systems 31 to 3n (n is an integer of two or higher).

Configurations included in the vehicle system 1 are communicably connected to each other via an in-vehicle network 100. Examples of the in-vehicle network 100 include a controller area network (CAN) or Ethernet (registered trademark).

The driver assistance system 20 is configured to realize various functions used for assisting the driving of a vehicle, including at least driving control and braking control of the vehicle, by executing one or more applications to be installed. Examples of the applications installed in the driver assistance system 20 include an autonomous driving application that realizes an autonomous driving function, an autonomous parking application that realizes an autonomous parking function, and an ADAS application that realizes an advanced driver assistance system function. The ADAS application includes an application that realizes a function of calculating a trajectory corrected from a current vehicle trajectory to a target trajectory in order to cause the vehicle to travel along a predetermined target trajectory, an application that realizes a function of assisting collision avoidance (PCS and the like), an application that realizes a function of traveling along a preceding vehicle (ACC and the like) while constantly keeping a distance between the vehicle and the preceding vehicle, an application that realizes a function of lane-keeping assistance (LKA, LTA, and the like) that enables the vehicle to stay in a traveling lane, an application that realizes a function of collision damage mitigation braking (AEB and the like) that autonomously applies braking to reduce collision damage, an application that realizes a function of lane deviation warning (LDW, LDA, and the like) that warns of the vehicle deviating from a traveling lane, and the like.

Each of the applications of the driver assistance system 20 outputs, based on vehicle information (recognition sensor information and the like) acquired (received) from various sensors (not shown), a kinematic plan request that guarantees the functionality (commerciality) of each application independently to the manager 10 as a request of the application. This kinematic plan includes requests, such as longitudinal acceleration/deceleration and curvature generated in the vehicle. Further, each application of the driver assistance system 20 can output identification information (an application ID) that can uniquely identify its own application to the manager 10 together with the kinematic plan. This application ID is uniquely determined in advance for each application.

The driver assistance system 20 is realized by a computer, for example, an ECU, having a processor, such as a CPU, a memory, and an input/output interface. The number of ECUs forming the driver assistance system 20 or the number of applications installed in the ECU is not particularly limited. Further, as the driver assistance system 20, each ECU may be provided for each application. For example, the driver assistance system 20 may be configured by an autonomous driving ECU in which an autonomous driving application is installed, an autonomous parking ECU in which an autonomous parking application is installed, and an ADAS-ECU in which an advanced driver assistance system application is installed. Further, a plurality of ADAS applications may be installed in a plurality of ECUs, such as an ECU in which an ADAS application that realizes an ACC function is installed, an ECU in which an ADAS application that realizes an LKA function is installed, and an ECU in which an ADAS application that realizes an AEB function is installed.

The actuator systems 31 to 3n are one of the realization systems used for realizing the kinematic plan request output by the driver assistance system 20. Examples of the actuator systems 31 to 3n include an electric power steering (EPS) system that includes a steering actuator (such as an EPS motor) that can generate torque in a steering shaft to assist the steering of a steering wheel and realizes a part or all of the kinematic plan request by controlling the operation of the steering actuator. From the viewpoint of fail-safe, the EPS system is redundant with two (main and sub) identical configurations such that steering control can be continued even when a malfunction, such as a failure, occurs. Further, examples of the actuator systems 31 to 3n include an electronic brake system (EBS) that includes a brake actuator (such as a hydraulic brake) that can generate braking force on the vehicle and realizes a part or all of the kinematic plan request by controlling the operation of the brake actuator. This EBS may also be redundantly structured. Further, examples of the actuator systems 31 to 3n include a dynamic rear steering (DRS) system that includes an actuator that can steer a rear wheel in a vehicle width direction and realizes a part or all of the kinematic plan request by controlling the operation of the actuator. Further, examples of the actuator systems 31 to 3n include a system that includes an actuator (EV/HV motor and the like) capable of generating braking/driving force in the vehicle and realizes a part or all of the kinematic plan request by controlling the operation of the actuator. Furthermore, examples of the actuator systems 31 to 3n also include an adaptive variable suspension system (AVS) that optimizes the damping force of an absorber according to changes in the vehicle, such as road surface irregularities, or an active stabilizer system that restricts the roll of a vehicle body.

The manager 10 determines the control content regarding the motion of the vehicle based on the kinematic plan requests received from the driver assistance system 20, and outputs necessary requests to the actuator systems 31 to 3n based on the determined control content. In this case, the manager 10 distributes the motion requests to one or more of the actuator systems 31 to 3n based on the system status (information on availability or a failure, and the like) that is received from each of the actuator systems 31 to 3n as feedback.

The manager 10 functions as an ADAS-MGR, a Vehicle-MGR, or the like related to so called the motion of the vehicle, or as a part of the ADAS-MGR or the Vehicle-MGR, and controls the vehicle motion. The manager 10 includes a reception unit 11, an arbitration unit 12, a calculation unit 13, and a distribution unit 14.

The reception unit 11 receives the kinematic plan requests output by a plurality of applications of the driver assistance system 20. As the kinematic plan in the embodiment, the curvature of a corrected trajectory on a lateral motion of the vehicle can be exemplified. The kinematic plan requests received by the reception unit 11 are output to the arbitration unit 12.

The arbitration unit 12 arbitrates a plurality of kinematic plan requests received by the reception unit 11 from each of the applications of the driver assistance system 20. As the processing of the arbitration, it can be exemplified that one kinematic plan is selected from a plurality of kinematic plans based on a predetermined selection criterion (for example, Min selection). Further, as another arbitration processing, a new kinematic plan can be set based on the plurality of kinematic plans.

The calculation unit 13 calculates the motion requests based on an arbitration result of the kinematic plan requests in the arbitration unit 12. These motion requests are physical quantities that request the vehicle motion for realizing the arbitrated kinematic plan and are different from the physical quantities of the kinematic plan requests. For example, when the kinematic plan is a curvature, a yaw moment or a yaw rate of the vehicle used for following the curvature is calculated as the motion request.

The distribution unit 14 appropriately distributes the motion requests calculated by the calculation unit 13 to one or more actuators based on the states of the actuator systems 31 to 3n. At the time of the distribution, each request may be converted into a command value of a physical quantity suitable for an actuator system of a distribution destination.

For example, when the motion requests are distributed to actuator systems of the EPS, the yaw moment/yaw rate of the vehicle is converted into a command value of a steering angle of the steering. When the motion requests are distributed to actuator systems of the DRS, the yaw moment/yaw rate of the vehicle is converted into a command value of a steering angle of the rear wheel. When the motion requests are distributed to actuator systems of the AVS/active stabilizer system, the yaw moment/yaw rate of the vehicle is converted into a command value for roll stiffness. When the motion requests are distributed to actuator systems of the EBS, the yaw moment/yaw rate of the vehicle is converted into a command value of braking force (signed driving force) or deceleration of each wheel. When the motion requests are distributed to actuator systems of a driving motor in an electrified vehicle, the yaw moment/yaw rate of the vehicle is converted into a command value of driving force of each wheel. The conversion of the physical quantities can be executed based on a vehicle model predetermined for each vehicle depending on the characteristics of the vehicle, variations of actuators mounted on the vehicle, or the like. The conversion processing may be executed by the distribution unit 14, another configuration (not shown) of the manager 10, which is provided at the rear end of the distribution unit 14, or each of the actuator systems 31 to 3n.

The configuration of the above-described manager 10 which is mounted on the vehicle, driver assistance system 20, and actuator systems 31 to 3n is an example, and can be added to, replaced, changed, or omitted as appropriate. In addition, the functions of the respective devices can be appropriately integrated into and provided at one device or distributed to and provided at a plurality of devices.

Control

Figure 2:
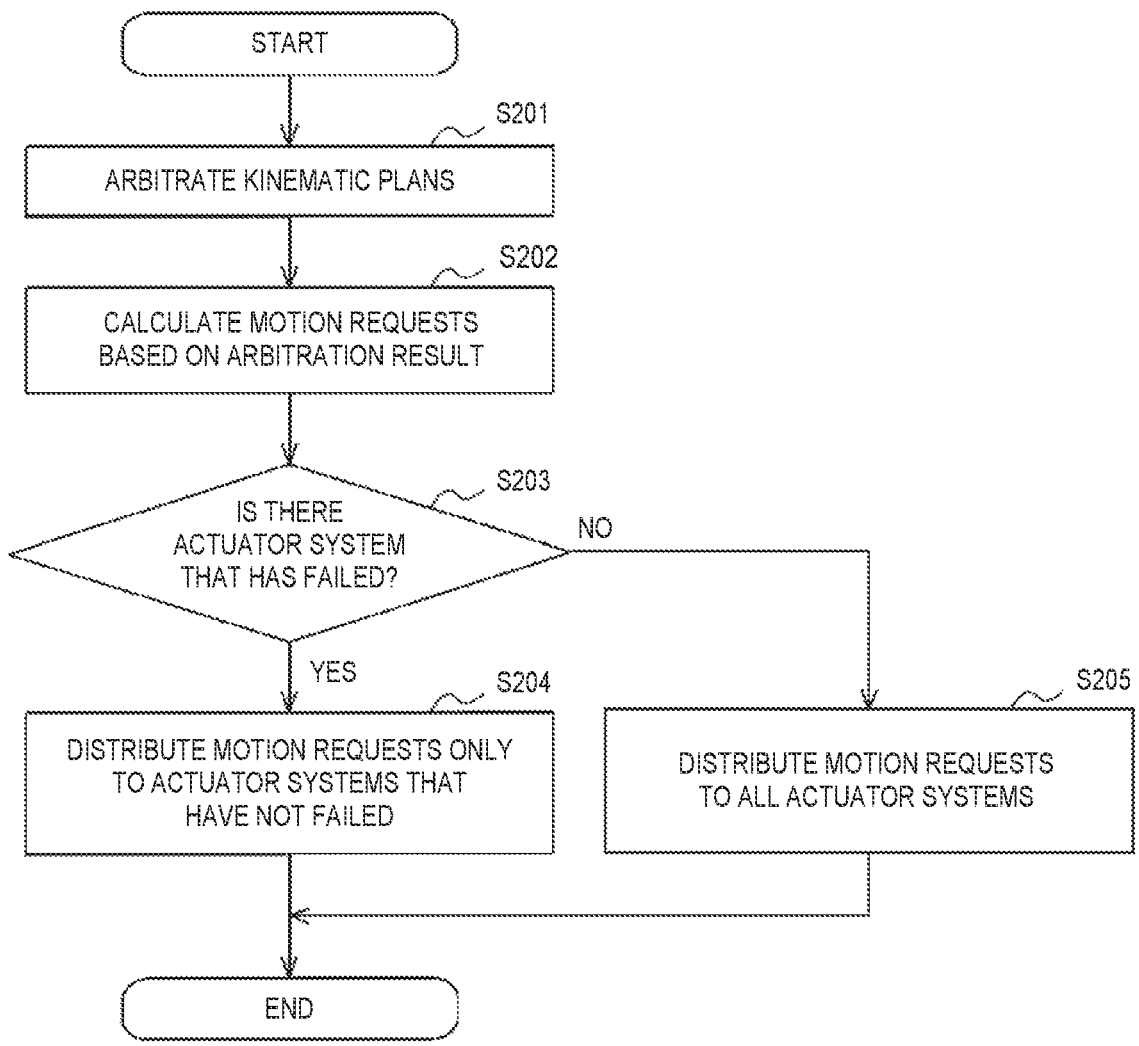
FIG. 2 is a flowchart illustrating processing procedures executed by a manager.

Further, the control executed by the manager 10 according to the embodiment will be described with reference to FIG. 2. FIG. 2 is a flowchart illustrating processing procedures executed by the manager 10. The processing illustrated in FIG. 2 is started when the reception unit 11 of the manager 10 receives the kinematic plan request from the application of the driver assistance system 20.

(Step S201) The arbitration unit 12 arbitrates one or more kinematic plans received by the reception unit 11 from the applications. Curvature can be exemplified as the kinematic plan. As the arbitration processing, a method of adopting a kinematic plan that requests the minimum value from among all kinematic plans can be exemplified. When the reception unit 11 receives one kinematic plan from the applications, this kinematic plan is adopted by the arbitration unit 12 as a result of the arbitration. When the arbitration of the kinematic plan is executed, the processing proceeds to step S202.

(Step S202) The calculation unit 13 calculates the motion requests based on the arbitration results of the arbitration unit 12. When the kinematic plan is curvature, the target yaw moment/yaw rate can be exemplified as the motion request. The calculated motion requests are output to the distribution unit 14 of the manager 10 as motion requests to be distributed to at least one of the actuator systems 31 to 3n. When the motion requests are calculated, the processing proceeds to step S203.

(Step S203) The distribution unit 14 determines whether there is an actuator system that has failed from among the actuator systems 31 to 3n mounted on the vehicle. The determination is possible based on the system state fed back from the actuator systems 31 to 3n. When there is an actuator system that has failed (step S203, yes), the processing proceeds to step S204, and when there is no actuator system that has failed (step S203, no), the processing proceeds to step S205.

(Step S204) The distribution unit 14 executes a suitable distribution of the motion requests only to the actuator systems that have not failed. When the distribution of the motion requests is executed, the processing of the manager 10 ends.

(Step S205) The distribution unit 14 executes a suitable distribution of the motion requests to all actuator systems. When the distribution of the motion requests is executed, the processing of the manager 10 ends.

Specific Example of Distribution

Figure 3:
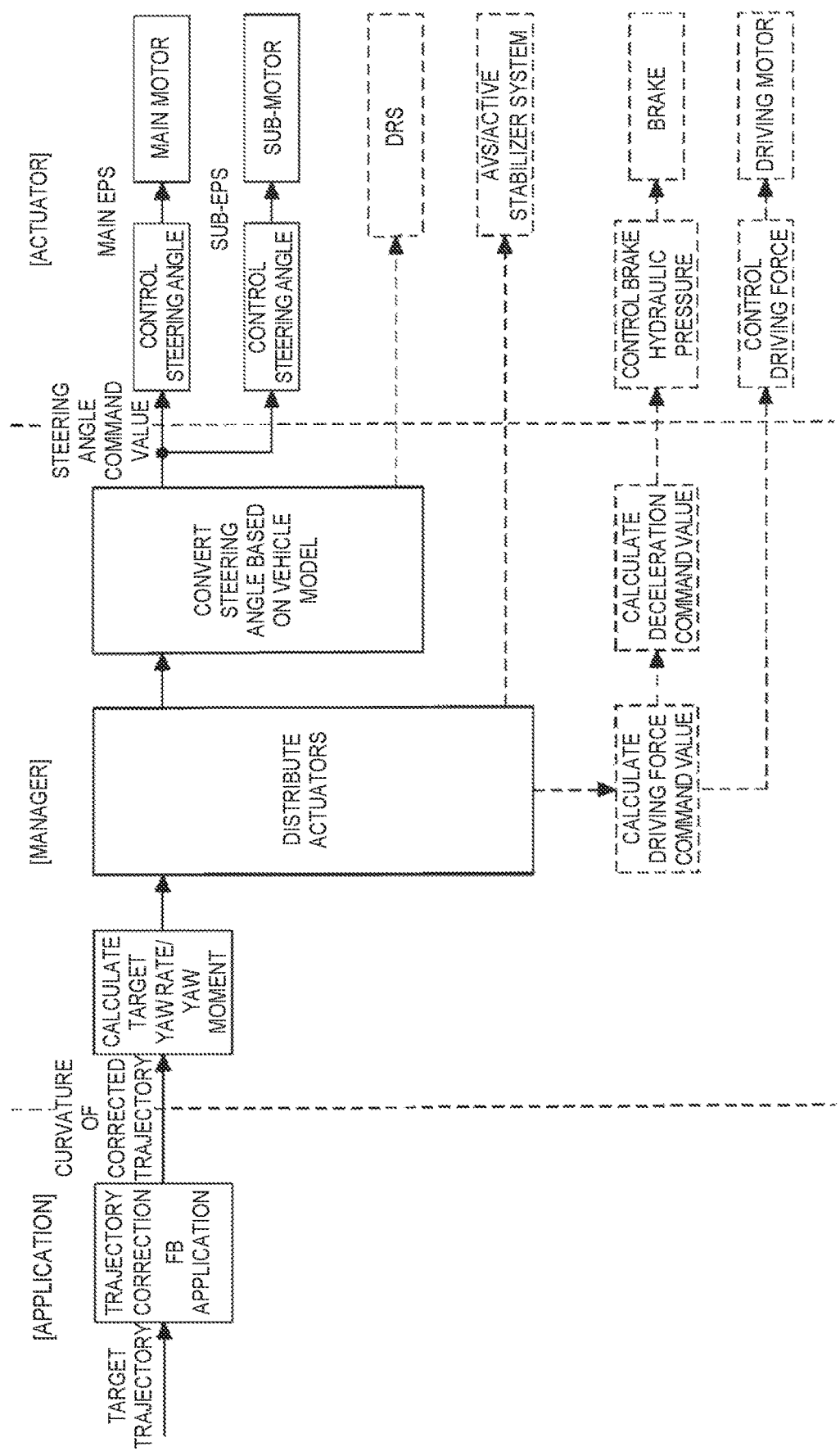
FIG. 3 is a diagram illustrating a specific example of motion request distribution executed by the manager.
Figure 4:
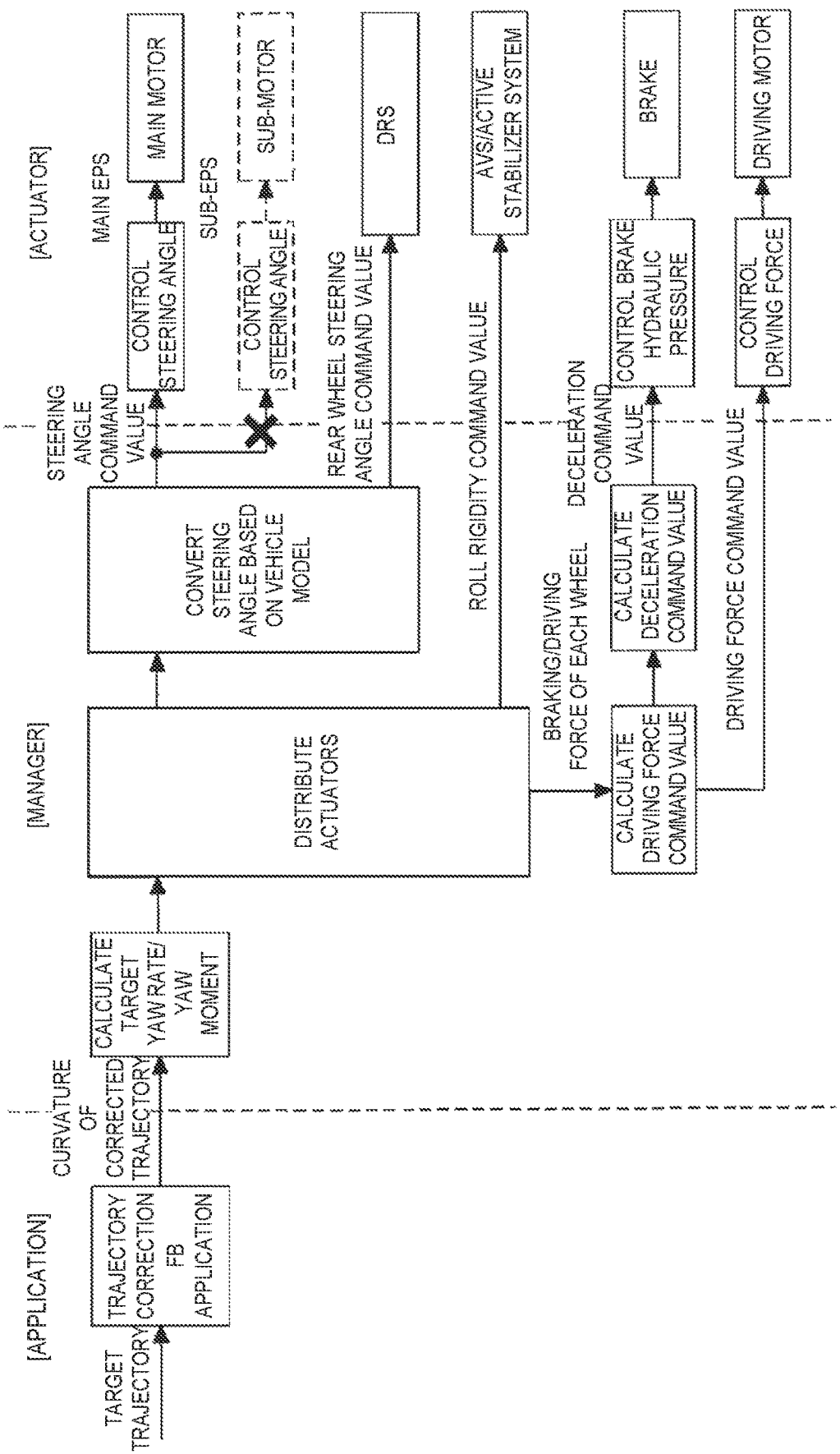
FIG. 4 is a diagram illustrating another specific example of the motion request distribution executed by the manager.

A specific example of the motion request distribution executed by the manager 10 will be described with reference to FIGS. 3 and 4. FIGS. 3 and 4 are examples illustrating the state of the manager 10 preferably distributing the physical quantities of the motion requests to the required actuators when the curvature of a corrected trajectory is requested as a kinematic plan from the application (a trajectory correction FB application) that calculates the corrected trajectory to cause the vehicle to follow a target trajectory. As a system related to control of the lateral motion of the vehicle, examples of the actuator include a main motor and a sub-motor used in two redundantly structured EPSs, a DRS, an AVS/active stabilizer system, a brake used for an EBS, and a driving motor used in an EHV system.

FIG. 3 is an example in which the manager 10 distributes (FIG. 2, step S205) the motion requests (the target yaw moment/yaw rate) to all actuator systems. In the example of FIG. 3, both the main EPS system and a sub-EPS system have no malfunctions, such as a failure, and all the kinematic plans from the trajectory correction FB application can be realized by the EPS systems, and thus the manager 10 converts the motion requests into steering angles for the main EPS system and the sub-EPS system and distributes the steering angles. Here, it is conceivable that all (100% output) of the motion requests can be covered only by the EPS system of any one of the main and the sub. However, in the case of such distribution, it is necessary for both the main EPS system and the sub-EPS system to include large motors capable of 100% output, respectively, and thus there remains a shortcoming in terms of loading space or cost. In the example of the present embodiment, the main EPS system covers 50% of the output, and the sub-EPS system covers the remaining 50% of the output, such that the total output of both EPS systems is 100%.

FIG. 4 is another example in which the manager 10 distributes (FIG. 2, step S204) the motion requests (the target yaw moment/yaw rate) to only the actuator systems that have not failed. In the example of FIG. 4, the sub-EPS system has failed, and only 50% of the kinematic plan from the trajectory correction FB application can be realized by the main EPS system. Therefore, the manager 10 distributes the motion requests to not only the main EPS system but also to other actuator systems. For example, the manager 10 converts the motion requests into rear wheel steering angle command values when distributing the motion requests to the DRS, and converts the motion requests into roll rigidity command values when distributing the motion requests to the AVS/active stabilizer system. In addition, the manager 10 converts the motion requests into deceleration command values when distributing the motion requests to the brake, and converts the motion requests into driving force command values when distributing the motion requests to the driving motors. As such, it is possible to realize all or part of the 50% of the kinematic plan that the sub-EPS system is supposed to realize by using other actuator systems.

Action and Advantageous Effect

As described above, in the vehicle system according to one embodiment of the present disclosure, when a malfunction, such as a failure, occurs in the actuator system, the motion request part distributed to the actuator system that has failed can be distributed to other actuator systems. As a result, it is possible to realize the motion request according to the kinematic plan without notifying each of the applications of the actuator system of the failure or limitation of the actuator system or requesting the trajectory correction. That is, each of the applications of the actuator system can request the manager to make a usual kinematic plan without paying attention to the state of the actuator system mounted on the vehicle. Therefore, it is possible to avoid a complicated design of an ECU or an I/F having the applications installed thereon.

Further, in the vehicle system according to one embodiment of the present disclosure, by receiving the curvature from each of the applications of the actuator system, it is possible to distribute the motion requests to the actuator systems other than the EPS systems controlled by the steering angle. Therefore, even when one of the redundantly structured EPS systems fails, it is possible to realize the kinematic plan request by cooperating with the other EPS system and the other actuator system.

Each of the EPS system, the EBS system, or the like redundantly mounted on the vehicle may be configured such that the main system and the sub-system are configured by separating batteries to be used, power supply systems, and/or communication control systems. With the configuration described above, even when a malfunction occurs in one of the systems other than the actuator system, vehicle control can be continued by the other system.

One embodiment of the technology disclosed in the present disclosure is described above. However, the present disclosure can be regarded not only as a manager mounted on a vehicle, but also as an ECU, a system that includes the ECU and the manager, a control method executed by the manager including one or more processors and a memory, a control program, a computer-readable non-transitory storage medium storing the control program, a vehicle including the manager, or the like.

The present disclosure is useful for a manager and the like mounted on a vehicle or the like.

What is claimed is:

1. A manager mounted on a vehicle, the manager comprising:
one or more processors configured to: receive a plurality of kinematic plans from a plurality of advanced driver assistance system applications, each of the kinematic plans includes a curvature and does not include a yaw moment or a yaw rate;
arbitrate the kinematic plans;
before distribution, calculate a motion request based on an arbitration result of the kinematic plans regardless of presence or absence of failure in a plurality of actuator systems, the motion request includes a yaw moment or a yaw rate, one of the plurality of actuator systems being a steering system that includes a steering actuator;
distribute the calculated motion request to a first actuator system when no failure is detected in the first actuator system;
select a plurality of second actuator systems from among the plurality of first actuator systems as systems for redistributing the motion request distributed to the first actuator system when a failure is detected in the first actuator system;
convert the motion request to be distributed to the plurality of second actuator systems into a plurality of command values for the plurality of second actuator systems; and
distribute the plurality of converted command values to the second actuator systems, wherein:
when the selected plurality of second actuator systems includes a third actuator system and a fourth actuator system using a different physical quantity from the third actuator system, the one or more processors is configured to convert the motion request into the plurality of command values including a command value of a first physical quantity for the third actuator system and a second physical quantity for the fourth actuator system, the first physical quantity is different from the second physical quantity.

2. The manager according to claim 1, wherein the one or more processors are configured to receive, as the kinematic plans, curvatures required for the advanced driver assistance system applications to correct a current vehicle trajectory to a target trajectory.

3. The manager according to claim 1, wherein the one or more processors are configured to distribute the motion request only to an actuator system that does not fail from among the plurality of actuator systems.

4. The manager according to claim 1, wherein the steering system is redundantly structured in the plurality of actuator systems to which the one or more processors distribute the motion request.

5. A control method executed by a computer of a manager that includes one or more processors and a memory and that is mounted on a vehicle, the control method comprising:
   receiving a plurality of kinematic plans from a plurality of advanced driver assistance system applications, each of the kinematic plans includes a curvature and does not include a yaw moment or a yaw rate;
   arbitrating the kinematic plans;
   before distribution, calculating a motion request based on an arbitration result of the kinematic plans regardless of presence or absence of failure in a plurality of actuator systems, the motion request includes a yaw moment or a yaw rate, one of the plurality of actuator systems being a steering system that includes a steering actuator;
   distributing the calculated motion request to a first actuator system when no failure is detected in the first actuator system;
   selecting a plurality of second actuator systems from among the plurality of first actuator systems as systems for redistributing the motion request distributed to the first actuator system when a failure is detected in the first actuator system;
   converting the motion request to be distributed to the plurality of second actuator systems into a plurality of command values for the plurality of second actuator systems; and
   distributing the plurality of converted command values to the second actuator systems, wherein:
   when the selected plurality of second actuator systems includes a third actuator system and a fourth actuator system using a different physical quantity from the third actuator system, the one or more processors is configured to convert the motion request into the plurality of command values including a command value of a first physical quantity for the third actuator system and a second physical quantity for the fourth actuator system, the first physical quantity is different from the second physical quantity.

6. A non-transitory storage medium storing instructions that are executable by a computer of a manager, and that causes the computer to perform functions, the manager including one or more processors and a memory and being mounted on a vehicle, the functions comprising:
   receiving a plurality of kinematic plans from a plurality of advanced driver assistance system applications, each of the kinematic plans includes a curvature and does not include a yaw moment or a yaw rate;
   arbitrating the kinematic plans;
   before distribution, calculating a motion request based on an arbitration result of the kinematic plans regardless of presence or absence of failure in a plurality of actuator systems, the motion request includes a yaw moment or a yaw rate, one of the plurality of actuator systems being a steering system that includes a steering actuator;
   distributing the calculated motion request to a first actuator system when no failure is detected in the first actuator system;
   selecting a plurality of second actuator systems from among the plurality of first actuator systems as systems for redistributing the motion request distributed to the first actuator system when a failure is detected in the first actuator system;
   converting the motion request to be distributed to the plurality of second actuator systems into a plurality of command values for the plurality of second actuator systems; and
   distributing the plurality of converted command values to the second actuator systems, wherein:
   when the selected plurality of second actuator systems includes a third actuator system and a fourth actuator system using a different physical quantity from the third actuator system, the one or more processors is configured to convert the motion request into the plurality of command values including a command value of a first physical quantity for the third actuator system and a second physical quantity for the fourth actuator system, the first physical quantity is different from the second physical quantity.

7. A vehicle comprising the manager according to claim 1.

8. The manager according to claim 1, wherein:
   the processor, after calculating the motion request, is configured to determine whether there is a failed actuator system in the plurality of actuator systems; and
   if there is a failed actuator system, distribute the calculated motion request to at least one of the actuator systems that has not failed among the plurality of actuator systems.

* * * * *